US008406926B1

(12) United States Patent
Lewis

(10) Patent No.: US 8,406,926 B1
(45) Date of Patent: Mar. 26, 2013

(54) METHODS AND SYSTEMS FOR ROBOTIC ANALYSIS OF ENVIRONMENTAL CONDITIONS AND RESPONSE THERETO

(75) Inventor: Thor Lewis, San Francisco, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/464,193

(22) Filed: May 4, 2012

Related U.S. Application Data

(60) Provisional application No. 61/483,295, filed on May 6, 2011, provisional application No. 61/596,533, filed on Feb. 8, 2012.

(51) Int. Cl.
*G06F 9/00* (2006.01)

(52) U.S. Cl. ........................................ 700/259; 382/115

(58) Field of Classification Search ............... 700/1, 19, 700/31, 47, 245, 259; 382/115, 155, 159, 382/160, 162, 165, 181, 190
See application file for complete search history.

(56) References Cited

U.S. PATENT DOCUMENTS

| | | | | |
|---|---|---|---|---|
| 6,539,283 | B2 * | 3/2003 | Takagi | 700/245 |
| 7,260,430 | B2 * | 8/2007 | Wu et al. | 600/545 |
| 7,797,079 | B2 | 9/2010 | Jang et al. | |
| 7,813,835 | B2 * | 10/2010 | Fujita et al. | 700/245 |
| 2007/0198129 | A1 * | 8/2007 | Koselka et al. | 700/245 |

FOREIGN PATENT DOCUMENTS

EP    2281667    2/2011

OTHER PUBLICATIONS

Ruiz-Del-Solar, Javier, Personal Robots as Ubiquitous-Multimedial-Mobile Web Interfaces, Web Conference, 2007, LA-WEB 2007, Latin America.

* cited by examiner

*Primary Examiner* — Dalena Tran
(74) *Attorney, Agent, or Firm* — McDonnell Boehnen Hulbert & Berghoff LLP

(57) ABSTRACT

Methods and systems for robotic analysis of an ambient environment, as well as a user, are provided. In some examples, a robotic device may provide a personalized interaction or response to a user based on a determined state of the environment (such as local weather), and a state of the user.

17 Claims, 8 Drawing Sheets

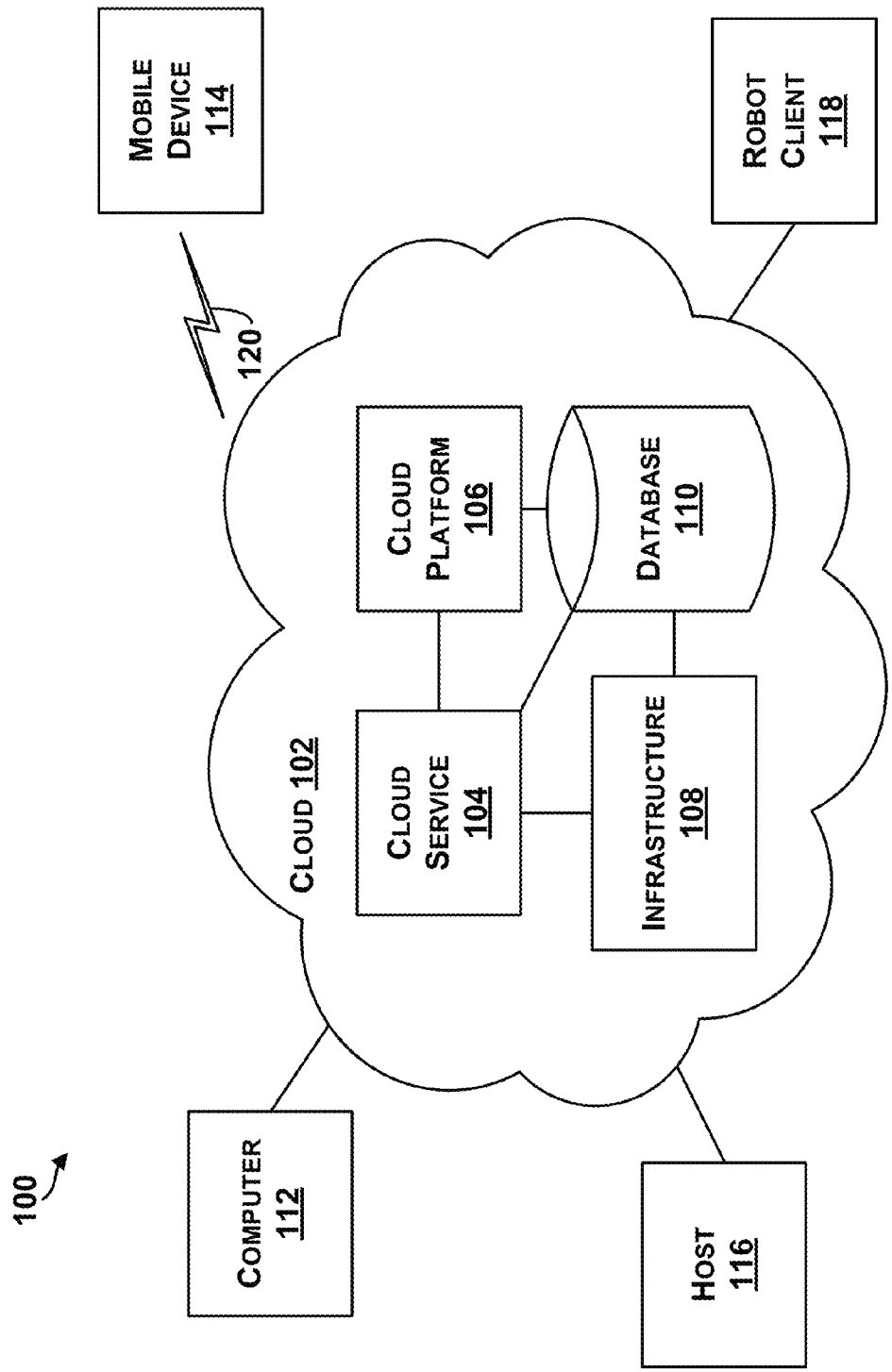

METHODS AND SYSTEMS FOR ROBOTIC ANALYSIS OF ENVIRONMENTAL CONDITIONS AND RESPONSE THERETO

CROSS-REFERENCE TO RELATED APPLICATIONS

The present disclosure claims priority to U.S. Patent Application No. 61/483,295, filed on May 6, 2011, and to U.S. Patent Application No. 61/596,533, filed on Feb. 8, 2012, the entire contents of each of which are herein incorporated by reference.

BACKGROUND

Cloud computing refers to provision of computational resources via a computer network. In a traditional model of computing, both data and software are fully contained on a user's computer. In cloud computing, however, the user's computer may contain relatively little software or data (perhaps a minimal operating system and web browser, for example), and may serve as a display terminal for processes occurring on a network of computers. A common shorthand provided for a cloud computing service or system (or even an aggregation of existing cloud services) is "the cloud."

Cloud computing has been referred to as "client-server computing", however, there may be distinctions between general cloud computing and client-server computing. For example, client-server computing may include a distributed application structure that partitions tasks or workloads between providers of a resource or service (e.g., servers), and service requesters (e.g., clients). Client-server computing generally involves a one-to-one relationship between the server and the client, whereas cloud computing includes generic services that can be accessed by generic clients (e.g., a one-to-one relationship or connection may not be required). Thus, cloud computing generally includes client-server computing, and additional services and functionality.

Cloud computing may free users from certain hardware and software installation and maintenance tasks through use of simpler hardware on the user's computer that accesses a vast network of computing resources (e.g., processors, hard drives, etc.). Sharing of resources may reduce cost to individuals. Thus, any computer connected to the cloud may be connected to the same pool of computing power, applications, and files. Users can store and access personal files such as music, pictures, videos, and bookmarks or play games or use productivity applications on a remote server rather than physically carrying around a storage medium, such as a DVD or thumb drive.

In one example, a user may open a browser and connect to a host of web servers that run user interface software that collect commands from the user and interpret the commands into commands on the servers. The servers may handle the computing, and can either store or retrieve information from database servers or file servers and display an updated page to the user. Through "cloud computing," data across multiple servers can be synchronized around the world allowing for collaborative work on one file or project, from multiple users around the world, for example.

SUMMARY

In one example, a method is provided that comprises receiving, at a robotic device that includes at least one sensory device, an environmental input including data relating to an environmental condition about an environment in a vicinity of the robotic device. The method also comprises receiving, at the robotic device, a user-related input including data relating to a user in a vicinity of the robotic device, and processing the environmental input to obtain information about a state of the environmental condition from an informational source containing environmental information. The method further comprises performing, by the robotic device, an output function based on the state of the environmental condition and the user-related input.

In another example, a non-transitory computer readable medium having stored therein instructions executable by a robotic device that includes at least one sensory device to cause the robotic device to perform functions is provided. The function comprise receiving, at the robotic device, an environmental input including data relating to an environmental condition about an environment in a vicinity of the robotic device. The functions also comprise receiving, at the robotic device, a user-related input including data relating to a user in a vicinity of the robotic device. The functions also comprise processing the environmental input to obtain information about a state of the environmental condition from an informational source containing environmental information, and performing, by the robotic device, an output function based on the state of the environmental condition and the user-related input.

In another example, a robotic device is provided that comprises one or more processors, and at least one sensor coupled to the one or more processors and configured to capture environmental data about an environment in a vicinity of the sensor or a user. The robotic device also comprises memory including instructions stored thereon executable by the one or more processors to perform functions. The functions comprise obtaining user-related data from an electronic device, and the user-related data relates to communication between the user and the electronic device. The functions also comprise obtaining, from the at least one sensor, environment sensory data about a sensed environment condition, and processing the environment sensory data to determine environment information about a state of the environment from an informational source containing environment information. The functions also comprise determining an output function based on the environment information and the user-related data.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In addition, circuitry may be provided that is wired to perform logical functions in any processes or methods described herein.

In still further examples, any type of devices may be used or configured to perform logical functions in any processes or methods described herein.

In yet further examples, any type of devices may be used or configured as means for performing functions of any of the methods described herein (or any portions of the methods described herein).

The foregoing summary is illustrative only and is not intended to be in any way limiting. In addition to the illustrative aspects, embodiments, and features described above, further aspects, embodiments, and features will become apparent by reference to the Figures and the following Detailed Description.

BRIEF DESCRIPTION OF THE FIGURES

FIG. 1 is an example system for cloud-based computing.

DETAILED DESCRIPTION

Figure 2A:
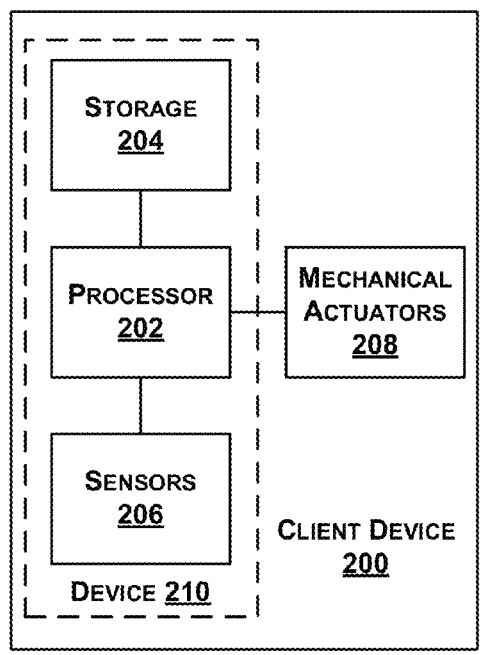
FIG. 2A illustrates an example client device.

In the following detailed description, reference is made to the accompanying Figures, which form a part hereof. In the Figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure includes, inter alia, methods and systems for robot and user interaction over the cloud. Within examples, cloud-based computing generally refers to networked computer architectures in which application execution and storage may be divided, to some extent, between client and server devices. A robot may be any device that has a computing ability and interacts with its surroundings with an actuation capability (e.g., electromechanical capabilities). A client device may be configured as a robot including various sensors and devices in the forms of modules, and different modules may be added or removed from robot depending on requirements. In some examples, a robot may be configured to receive a second device, such as mobile phone, that may be configured to function as an accessory or a "brain" of the robot.

In examples described herein, a robot may interact with the cloud to perform any number of actions, such as to share information with other cloud computing devices. Within examples, a robot may interact with a user in a manner that is based upon many types of received information. A robot may access a user device to determine or identify information about a user or related to the user, and the robot may be configured to tailor a method of interaction with the user based on the identified information. A robot may further receive data associated with the user to identify the user, such as using speech or face recognition. The robot may provide a personalized interaction or response to the user based on the determined information of the user, or based on a user-profile. In some instances, a default user-profile may be provided, and can be linked to other profiles that the user has created, as on social networking sites, such that the robot can access up-to-date and accurate information regarding the user. The user-profile may include information corresponding to the user's personality, history, lifestyle, preferences, and/or predispositions. The robot may use such information when interacting with the user.

In some examples, a robotic apparatus may have the capability to perform actions using contextual/situational data obtained from the environment of the robotic apparatus, or a user, such as time of day, weather outside, and condition of the user, for example. In particular, a robot may be configured to assess a vicinity of the robot, or environment, for environmental data, and also assess a user to obtain user data. The robot may process the environmental and user data, either locally or through a cloud-based computational system, to extract and analyze matching and/or related or comparative data as well as collateral information related to the environment and/or user. The robot may further be configured to determine a conclusion as a result of the analysis performed.

The term "environment" will be used in this disclosure as a generic reference to whatever may be assessed in the way of conditions in the local vicinity of the robot, sometimes also referred to as the ambient environment, or a remote vicinity, which may be where a user is located or may be located at some future time, or where there is some interest presented to the robot or user. The environment could also include a condition of the user (such as what the user is wearing, holding, doing). For example, a robot may determine that a local environment has progressed to a nighttime state. During nighttime, the robot may be configured to move slowly and make less noise to be quiet, and thus, based on the environmental conditions, the robot may adjust functionality accordingly so as to operate in a mode that adapts to the environmental condition. As another example, based on a determination that a local environment is in a morning state, the robot may be configured to perform a function of making coffee and offering coffee to the user (possibly based on past conduct or from accessing an informational resource that a user drinks coffee in the morning).

As a further example, based on a determination that local weather is rainy (e.g., possibly through receiving an input at a sensor of the robot or from accessing a device or informational resource with weather data), the robot may be configured to perform a function of obtaining an umbrella and offering the umbrella to a user, who the robot has determined from user input is about to venture outside. Thus, the robot may be configured to determine context/situation data from the environment and/or the user, and determine an appropriate response/function.

1. CLOUD COMPUTING ARCHITECTURE

Referring now to the Figures, FIG. 1 is an example system 100 for cloud-based computing. Cloud-based computing generally refers to networked computer architectures in which application execution and storage may be divided, to some extent, between client and server devices. A "cloud" may refer to a service or group of services accessible over a network (e.g., Internet) by client and server devices, for example.

In one example, any computer connected to the cloud may be connected to the same pool of computing power, applications, and files. Thus, cloud computing enables a shared pool of configurable computing resources (e.g., networks, servers, storage, applications, and services) that can be provisioned and released with minimal management effort or service provider interaction. Users can store and access personal files such as music, pictures, videos, and bookmarks or play games or use productivity applications on a remote server rather than physically carrying around a storage medium.

As an example, in contrast to a predominately client-based or server-based application, a cloud-based application may store copies of data and/or executable program logic at remote server devices, while allowing client devices to download at least some of this data and program logic as needed for execution at the client devices. In some examples, downloaded data and program logic can be tailored to capabilities of specific client devices (e.g., a personal computer, tablet, or mobile phone, or robot) accessing the cloud based application. In addition, dividing application execution and storage between the client and server devices allows more processing to be performed by the server devices taking advantage of server devices processing power and capability, for example.

Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

In FIG. 1, a cloud 102 includes a cloud service 104, a cloud platform 106, a cloud infrastructure 108, and a database 110. The cloud 102 may include more of fewer components, and each of the cloud service 104, the cloud platform 106, the cloud infrastructure 108, and the database 110 may comprise multiple elements as well. Thus, one or more of the described functions of the system 100 may be divided up into additional functional or physical components, or combined into fewer functional or physical components. Components of the cloud may be in communication via wired or wireless links. In some further examples, additional functional and/or physical components may be added to the examples illustrated by FIG. 1. Delivery of cloud computing may involve multiple cloud components communicating with each other over application programming interfaces, such as web services and three-tier architectures, for example.

The cloud 102 may represent a networked computer architecture, and in one example, the cloud service 104 represents a queue for handling requests from client devices. The cloud platform 106 may include a frontend of the cloud and may be coupled to the cloud service 104 to perform functions to interact with client devices. The cloud platform 106 may include applications used to access the cloud 102 via a user interface, such as a web browser. The cloud infrastructure 108 may include service application of billing components of the cloud 102, and thus, may interact with the cloud service 104. The database 110 may represent storage capabilities by the cloud 102, and thus, may be accessed by any of the cloud service 104, the cloud platform 106, and/or the infrastructure 108.

The system 100 includes a number of client devices coupled to or configured to be capable of communicating with components of the cloud 102. For example, a computer 112, a mobile device 114, a host 116, and a robot client 118 are shown coupled to the cloud 102. Of course, more or fewer client devices may be coupled to the cloud 102. In addition, different types of client devices may be coupled to the cloud 102. For example, any of the client devices may generally comprise a display system, memory, and a processor.

The computer 112 may be any type of computing device (e.g., PC, laptop computer), and the mobile device 114 may be any type of mobile computing device (e.g., laptop, mobile telephone, cellular telephone).

The host 116 may be any type of computing device or transmitter including a laptop computer, a mobile telephone, that is configured to transmit data to the cloud 102.

The robot client 118 may comprise any computing device that has connection abilities to the cloud 102 and that has an actuation capability (e.g., electromechanical capabilities). A robot may further be a combination of computing devices. In some examples, the robot 118 may collect data and upload the data to the cloud 102. The cloud 102 may be configured to perform calculations or analysis on the data and return processed data to the robot client 118. In some examples, as shown in FIG. 1, the cloud 102 may include a computer that is not co-located with the robot client 118. In other examples, the robot client 118 may send data to a second client (e.g., computer 112) for processing.

Any of the client devices may include additional components. For example, the robot client 118 may include one or more sensors, such as a gyroscope or an accelerometer to measure movement of the robot client 118. Other sensors may further include any of Global Positioning System (GPS) receivers, infrared sensors, optical sensors (still image or motion picture), biosensors, Radio Frequency identification (RFID) systems, RADAR wireless sensors, haptic arrays and other touch sensors, and/or compasses, among others, for example.

In addition, any of the client devices may include an integrated user-interface (UI) that allows a user to interact with the device. For example, the robot client 118 may include various buttons and/or a touchscreen interface that allow a user to provide input. As another example, the robot client device 118 may include a microphone configured to receive voice commands from a user. Furthermore, the robot client 118 may include one or more interfaces that allow various types of user-interface devices to be connected to the robot client 118.

In FIG. 1, communication links between client devices and the cloud 102 may include wired connections, such as a serial or parallel bus. Communication links may also be wireless links, such as link 120, which may include Bluetooth, IEEE 802.11 (IEEE 802.11 may refer to IEEE 802.11-2007, IEEE 802.11n-2009, or any other IEEE 802.11 revision), or other wireless based communication links.

In other examples, the system 100 may include access points through which the client devices may communicate with the cloud 102. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the client devices may include a wired or wireless network interface through which the client devices can connect to the cloud 102 (or access points). As an example, the client devices may be configured use one or more protocols such as 802.11, 802.16 (WiMAX), LTE, GSM, GPRS, CDMA, EV-DO, and/or HSPDA, among others. Furthermore, the client devices may be configured use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

2. EXAMPLE ROBOT ARCHITECTURE

FIG. 2A illustrates an example client device 200. In one example, the client device 200 is configured as a robot. In some examples, a robot may contain computer hardware, such as a processor 202, memory or storage 204, and sensors 206. For example, a robot controller (e.g., processor 202, computing system, sensors 206) may all be custom-designed for a specific robot. The robot may have a link by which the link can access cloud servers (as shown in FIG. 1). A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities.

In one example, the storage 204 may be used for compiling data from various sensors 206 of the robot and storing program instructions. The processor 202 may be coupled to the storage 204 and may be configured to control the robot based on the program instructions. The processor 202 may also be able to interpret data from the various sensors 206 on the robot, as discussed above.

The client device 200 may also have components or devices that allow the client device 200 to interact with its environment. For example, the client device 200 may have mechanical actuators 208, such as motors, wheels 222, or movable arms 220 that enable the client device 200 to move or interact with the environment.

In some examples, various sensors and devices on the client device 200 may be modules. Different modules may be added or removed from a client device 200 depending on requirements. For example, in a low power situation, a robot may have fewer modules to reduce power usages. However, additional sensors may be added as needed. To increase an amount of data a robot may be able to collect, additional sensors may be added, for example.

In some examples, the client device 200 may be configured to receive a device, such as device 210, that includes the processor 202, the storage 204, and the sensors 206. For example, the client device 200 may be a robot that has a number of mechanical actuators (e.g., a movable base), and the robot may be configured to receive a mobile telephone to function as the "brains" or control components of the robot. The device 210 may be considered a module of the robot. The device 210 may be physically attached to the robot. For example, a mobile phone may sit on a robot's "chest" and form an interactive display. The device 210 may provide a robot with sensors, a wireless link, and processing capabilities, for example. The device 210 may allow a user to download new routines for his or her robot from the cloud. For example, a laundry folding routine may be stored on the cloud, and a user may be able to select this routine using a mobile phone to download the routine from the cloud, and when the mobile phone is placed into or coupled to the robot, the robot would be able to perform the downloaded action.

In some examples, the client device 200 may be coupled to a mobile or cellular telephone to provide additional sensing capabilities. The cellular phone may not be physically attached to the robot, but may be coupled to the robot wirelessly. For example, a low cost robot may omit a direct connection to the Internet. This robot may be able to connect to a user's cellular phone via a wireless technology (e.g., Bluetooth) to be able to access the internet. The robot may be able to access various sensors and communication means of the cellular phone. The robot may not need as many sensors to be physically provided on the robot, however, the robot may be able to keep the same or similar functionality.

Thus, the client device 200 may include mechanical robot features, and may be configured to receive the device 210 (e.g., a mobile phone), which can provide additional peripheral components to the device 200, such as any of an accelerometer, gyroscope, compass, GPS, camera, WiFi connection, a touch screen, that are included within the device 210.

Figure 2B:
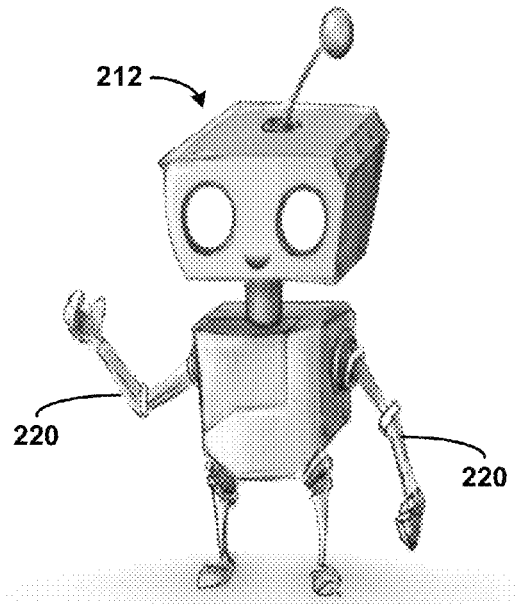
FIG. 2B illustrates a graphical example of a robot.

FIG. 2B illustrates a graphical example of a robot 212. In FIG. 2B, the robot 212 is shown as a mechanical form of a humanoid including arms, legs, and a head. The robot 212 may be configured to receive any number of modules or components, such a mobile phone, which may be configured to operate the robot. In this example, a device (e.g., robot 212) can be attached to a mobile phone (e.g., device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

In one example, the robot 212 may be a toy with only limited mechanical functionality, and by connecting device 210 to the robot 212, the toy robot 212 may now be capable of performing a number of functions with the aid of the device 210 and/or the cloud. In this manner, the robot 212 (or components of a robot) can be attached to a mobile phone to transform the mobile phone into a robot (e.g., with legs/arms) that is connected to a server to cause operation/functions of the robot.

The mountable device 210 may further be configured to maximize runtime usage of the robot 212 (e.g., if the robot 212 could learn what happens to cause the user to turn the toy off or set the toy down, the device 210 may be configured to perform functions to counteract such occurrences).

Figure 2C:
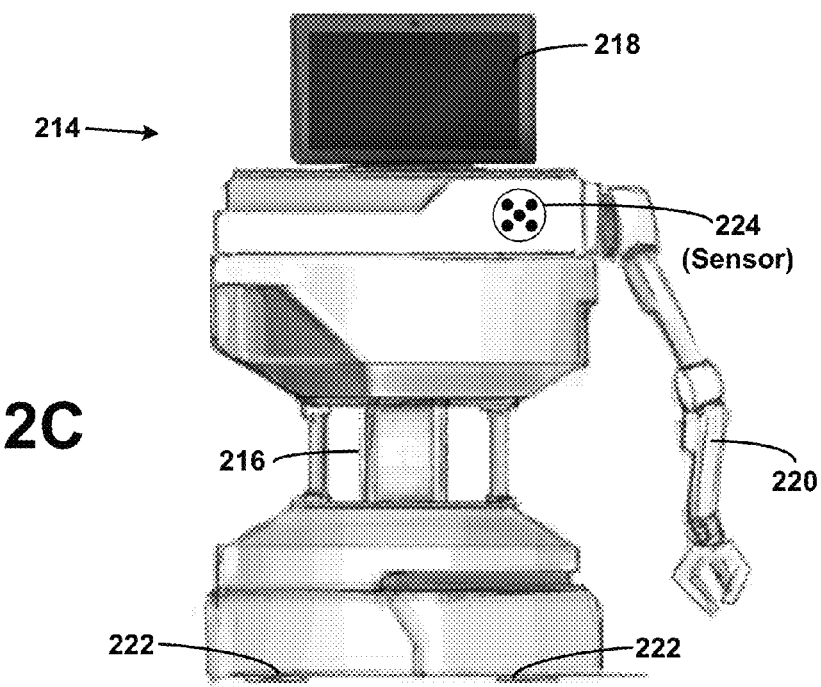
FIG. 2C illustrates another example of a robot.

FIG. 2C illustrates another example of a robot 214. The robot 214 includes a computing device 216, and a mechanical actuator 220. In this example, the computing device 216 may be a laptop computer or the equivalent thereof. Here, the robot has been provided with a video display or monitor 218, which may be coupled to sensors 224. The video monitor 218 could, as here, be used to project an image relating to a personality then being adopted by the robot 214. The sensors 224 may include a camera, infrared projectors, and other motion sensing or vision sensing elements. The robot 214 may include a base, wheels 222, and a motor upon which the computing device 216 and the sensors 218 can be positioned, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management), to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio), and other examples also include ROSJAVA. A robot operating system may include publish and subscribe functionality, and may also include functionality to control components of the robot, such as head tracking, base movement (e.g., velocity control, navigation framework).

3. ROBOT AND CLOUD INTERACTION

Figure 3:
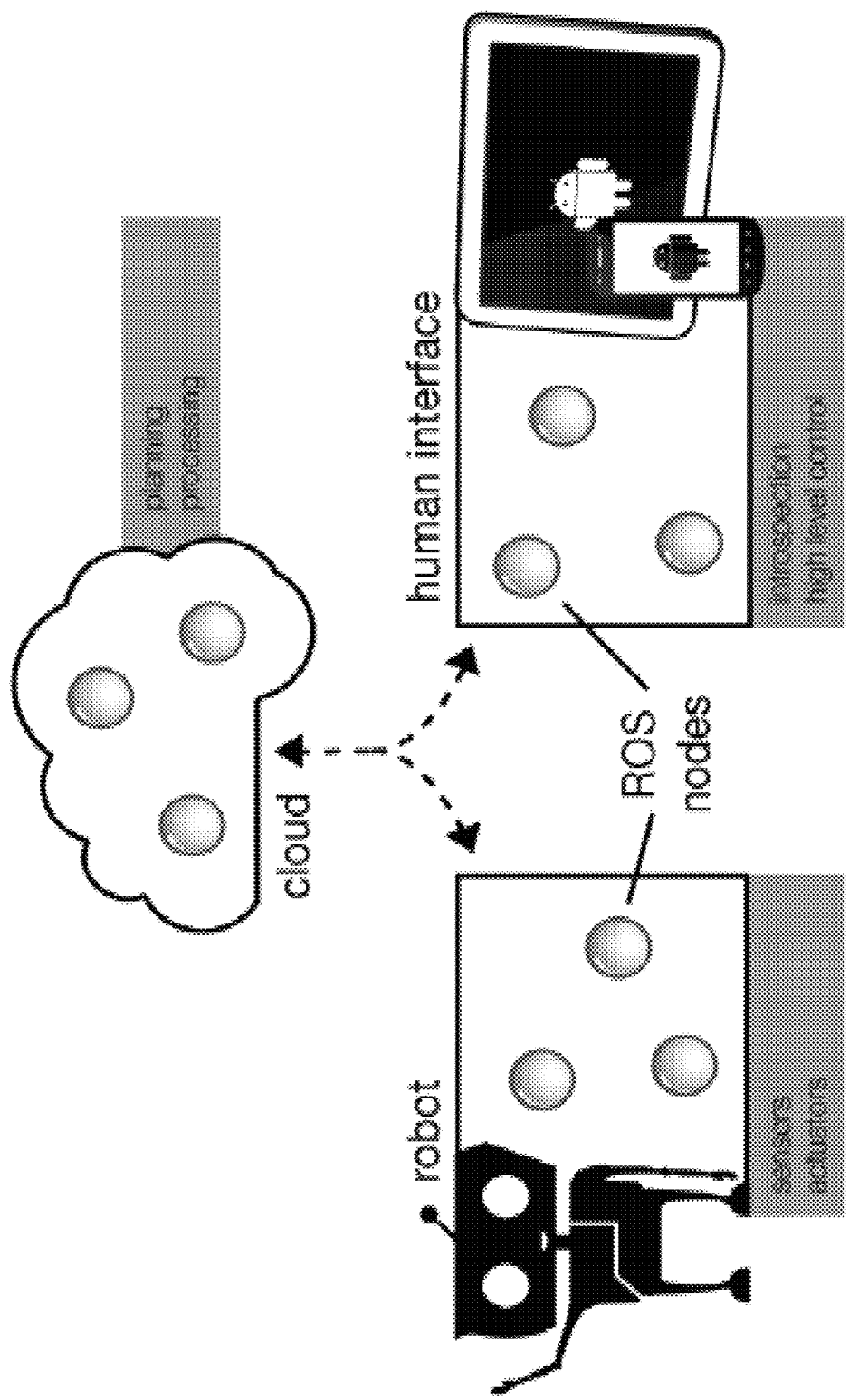
FIG. 3 illustrates an example of a conceptual robot-cloud interaction.

FIG. 3 illustrates an example of a robot-cloud interaction. A robot, such as a robot described and illustrated in FIGS. 2A-C, may connect to a network of computers (e.g., the cloud), and may request data or processing to be performed by the cloud. In one example, the robot may include a number of sensors and mechanical actuators that may generally provide motor control for the robot. The sensor inputs to the robot, such as camera feeds, vision sensors, touch sensors and other clothing probes, may be provided to the cloud, which can process these outputs to the cloud to enable the robot to extract information and perform functions. The cloud may process a camera feed, for example, to determine a location of a robot, perform object recognition as for an article of clothing, or to indicate a navigation pathway for the robot.

FIG. 3 generally illustrates motor controllers in which each module may conceptually represent a computer or node on the cloud that performs processing using motor controller inputs or data from the robot. FIG. 3 also generally illustrates sensors in which each module may conceptually represent a computer or node on the cloud that performs processing using sensor inputs or data from the robot. FIG. 3 further generally illustrates applications in which each module may conceptually represent a computer or node on the cloud that performs specific functions of a number of applications, e.g., navigation application, mapping application. In addition, FIG. 3 further generally illustrates planning in which each module may conceptually represent a computer or node on the cloud that performs processing for the robot, such as general planning or computing processing.

As shown, any of the modules may be interconnected, and/or may communicate to receive data or instructions from each other so as to provide a specific output or functionality for the robot.

In one example, the robot may send sensory data of clothing attributes to a cloud for data processing, and in another example the robot may receive data back from the cloud based upon processing of that sensory data. The data received from the cloud may be in many different forms. The received data may be a processed form of data the robot sent to the cloud. The received data may also come from sources other than the robot. For example, the cloud may have access to other sensors, other robots, and the Internet.

Figure 4:
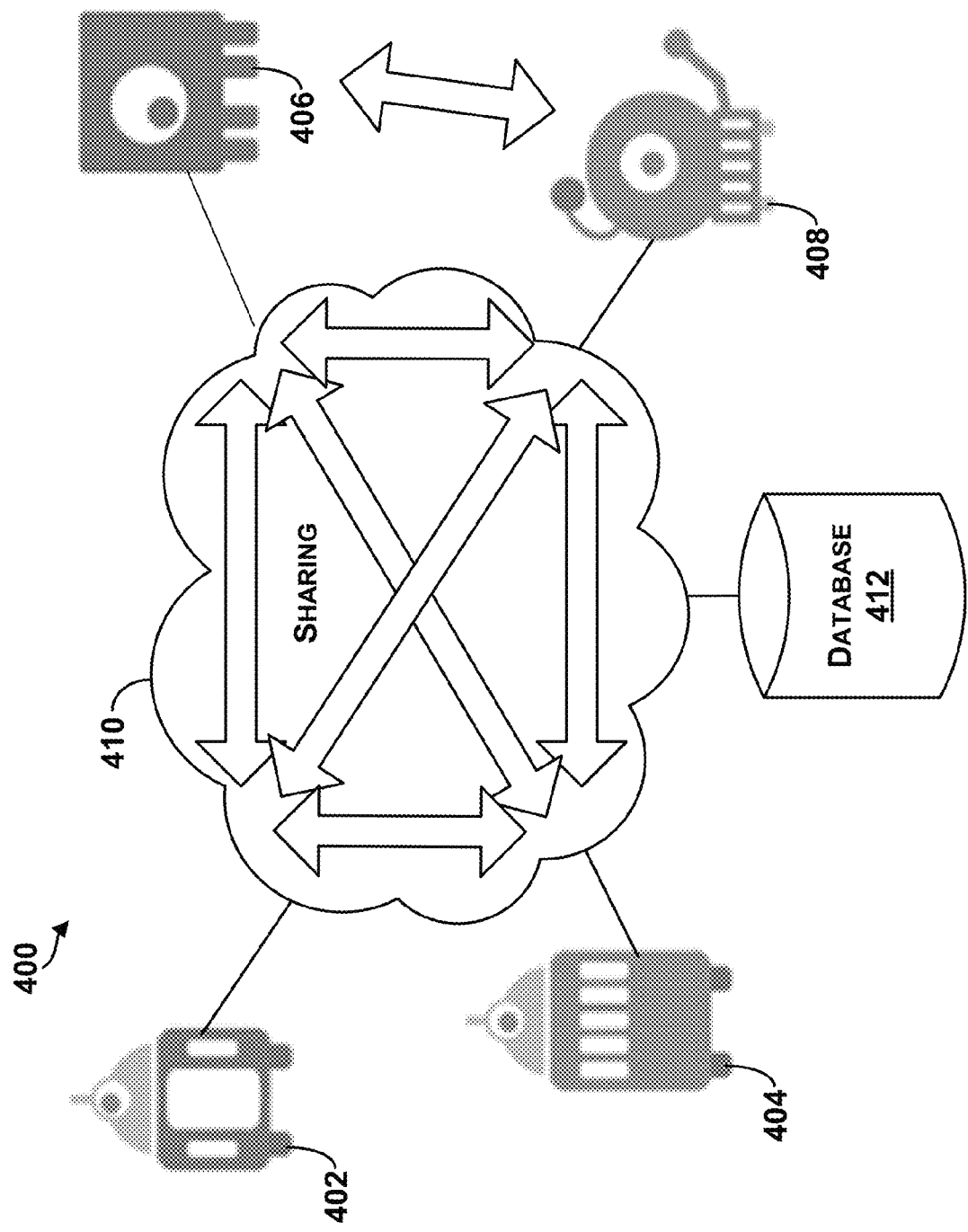
FIG. 4 is an example system in which robots may interact with the cloud and share information with other cloud computing devices.

FIG. 4 is an example system 400 in which robots may interact with the cloud and share information with other cloud computing devices. The system 400 illustrates robots 402, 404, 406, and 408 (e.g., as conceptual graphical representations) each coupled to a cloud 410. Each robot 402, 404, 406, and 408 may interact with the cloud 410, and may further interact with each other through the cloud 410, or through other access points and possibly directly (e.g., as shown between robots 406 and 408).

The cloud 410 may receive input from several robots. Data from each robot may be compiled into a larger data set. For example, the robot 402 may take a picture of a clothing object (image) and upload the image to the cloud 410. An object recognition program in the cloud 410 may be configured to identify the object in the image and provide data to all the robots connected to the cloud 410 about the recognized clothing, as well as possibly about other characteristics (e.g., metadata) of the recognized object, such as a location, size, weight, color. Thus, every robot may be able to know attributes of an object in an image uploaded by the robot 402.

The robots 402, 404, 406 and 408 may perform any number of actions with an area, people, or other robots. In one example, each robot 402, 404, 406 and 408 has WiFi or other network based connectivity and will upload/publish data to the cloud 410 that can then be shared with any other robot. In this manner, each robot 402, 404, 406 and 408 shares experiences with each other to enable learned behaviors. For example, the robot 402 may be evaluating a user's selection of a clothing item. Robot 402 makes an assessment or determination based upon the observed clothing and/or user, which can be shared with the other robots 404, 406, and 408 (through the cloud 410). Each robot 402, 404, 406, and 408 will have access to real-time up to date data. One or more of these other robots may be outside in the outdoors, and may proceed to perform some further function, such as obtaining environmental data on ambient weather conditions. In another example, the robot 404 can download data indicating images seen by the other robots 402, 406, and 408 to help the robot 404 better identify an article of clothing using various views (e.g., in instances in which the robots 402, 406, and 408 have captured images of the objects from a different perspective).

In still another example, the robot 408 may build a map of an area, and the robot 402 can download the map to have knowledge of the area. Similarly, the robot 402 could update the map created by the robot 408 with new information about the area (e.g., the hallway now has boxes or other obstacles), or with new information collected from sensors that the robot 408 may not have had (e.g., the robot 402 may be an outdoor robot, and may record and add temperature data to the map if the robot 408 did not have a temperature sensor). Overall, the robots 402, 404, 406, and 408 may be configured to share data that is collected to enable faster adaptation, such that each robot 402, 404, 406, and 408 can build upon a learned experience of a previous robot.

Sharing and adaptation capabilities enable a variety of applications based on a variety of inputs/data received from the robots 402, 404, 406, and 408. In a specific example, data regarding a history of a customer can be provided to a new robot interacting with that customer.

In one example, the cloud 410 may include, store, or provide access to a database 412 of information related to objects, and the database 412 may be accessible by all the robots 402, 404, 406, and 408. The database 412 may include information identifying clothing, food, weather states, machine operations, and details of all kinds that can be accessed by the robots 402, 404, 406, and 408 to perform recognition, correlation, determination and output functions.

The database 412 may be accessible by all robots through the cloud 410 (or alternatively directly accessible by all robots without communication through the cloud 410). The database 412 may thus be a shared knowledge-base stored in the cloud 410.

Thus, in some examples, robots may share new or learned behaviors through the cloud 410. The cloud 410 may have a server that stores robot learned activities or behaviors resulting in a shared knowledge-base of behaviors and heuristics for object interactions (e.g., a robot "app store"). Specifically, a given robot may perform actions and build a compendium, and then the robot can upload the data to the cloud 410 to share this knowledge with all other robots. In this example, a transportation of the given robot's "consciousness" can be made through the cloud 410 from one robot to another (e.g., robot "Bob" builds up a "map" of some clothing, and the knowledge of "Bob" can be downloaded onto another robot to receive knowledge of the "map").

Thus, within examples, the robots 402, 404, 406, and 408 may share information through the cloud 410, and may access the database 412.

4. ROBOT-USER INTERACTIONS

As mentioned, robots (or any client computing device) may interact with the cloud and users to perform any number of functions. Example functions are described below.

Figure 5:
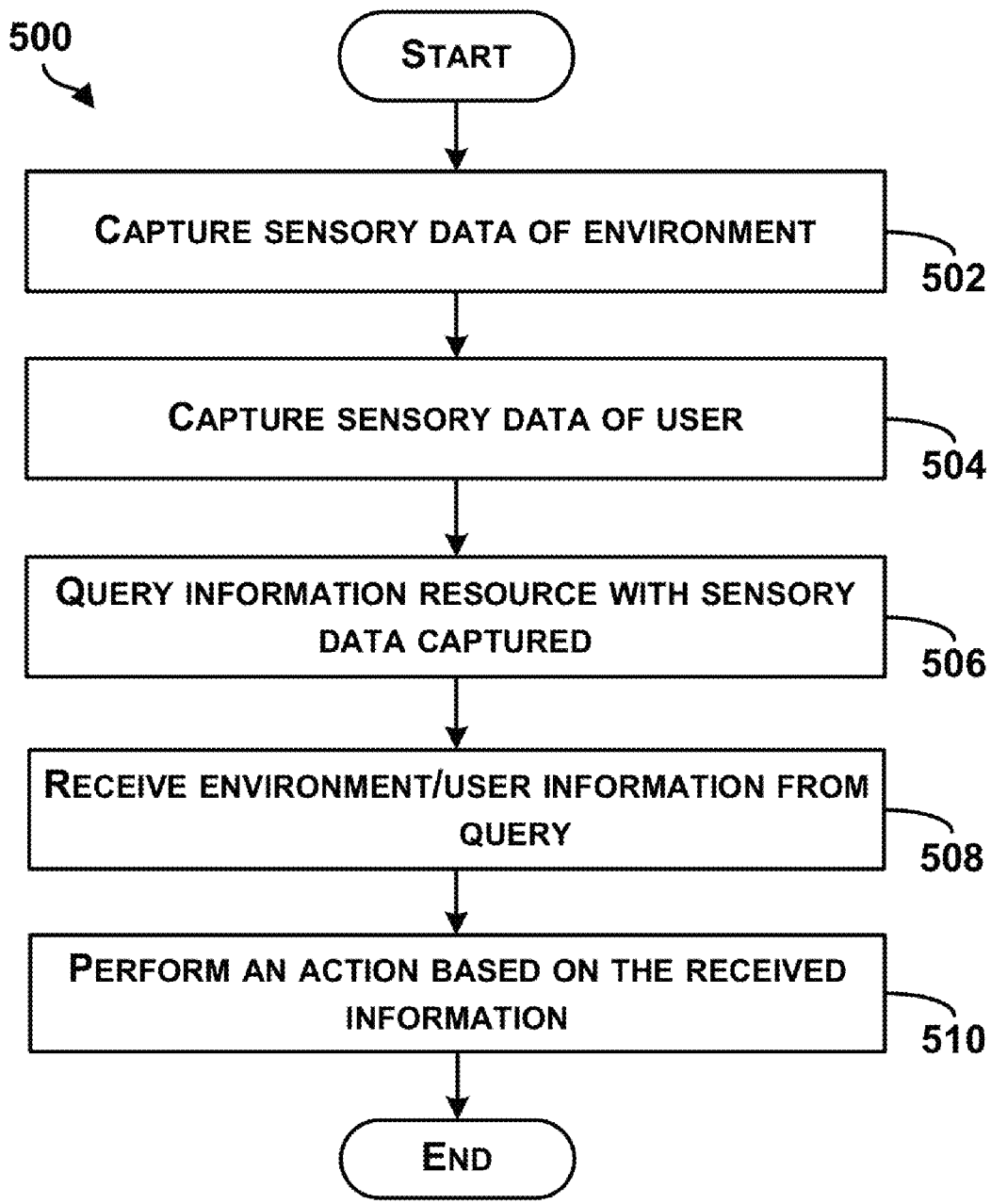
FIG. 5 is a block diagram of an example method of a robot interaction with the cloud to facilitate environment and user information.

FIG. 5 is a block diagram of an example method of a robot interaction with the cloud to facilitate clothing recognition, in accordance with at least some embodiments described herein. Method 500 shown in FIG. 5 presents an embodiment of a method that, for example, could be used with the systems 100 and 400, for example, and may be performed by a device, such as another devices illustrated in FIGS. 1-4, or components of the device. Method 500 may include one or more operations, functions, or actions as illustrated by one or more of blocks 502-510. Although the blocks are illustrated in a sequential order, these blocks may also be performed in parallel, and/or in a different order than those described herein, unless dictated by a necessary earlier step. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 500 and other processes and methods disclosed herein, each block in FIG. 5 may represent circuitry that is wired to perform the specific logical functions in the process.

At block 502, the method 500 includes capturing sensory data of the environment. In an example, a robot may capture or receive sensory data of the environment. The robot may include a computer processor, memory and operating system, and sensors configured to capture or receive sensory data of the environment. As an example, the robot may be configured to capture many images of objects using any number of sensors, such as a camera (still pictures or video feeds), infrared projectors, and other sensors as discussed herein. The environmental data may further be drawn from electronic data capture.

At block 504, the method 500 includes capture information associated with characteristics about a user. Block functions 502 and 504 need not be in this order. As an example, a robot may determine or record dimensions, a texture, color, pattern, material, or any type of physical attribute of clothing being worn by the user. As another example, in an instance in which the robot may communicate with an object, the robot may capture data of the object, such as by accessing a magnetic strip, RFID, near field communication clip, bar code, of the clothing item. The robot may communicate with the clothing to determine many types of data. Further, user data could be drawn from a user device.

Thus, the robot may include at least one additional sensory device capable of capturing data concerning a user in the vicinity of the robotic apparatus, to thereby obtain user data input. Obtaining user data input may include a first device associated with the robotic apparatus obtaining user data from a second device, and the user data may relate to communication between a user and the second device containing user data. The second device may be one or more of a personal computer, a mobile telephone, a tablet computer, and a landline telephone.

At block 506, the method 500 includes query a computing device with the captured image and/or information. This may be an informational resource. As an example, the robot may query the cloud with a captured image by sending the captured image to the cloud and requesting information about the image or electronic data, such as an identity of the image or information associated with the ambient environment. Alternatively, or in addition, the robot may query another robot directly to request information about the user, such as preferences and mood.

At block 508, the method 500 includes receiving information or retrieving information associated with the query. For example, the robot may receive data from the cloud indicating an identity of the clothing in the image, or other information related to the environment. As an example, environmental and user data can be processed to obtain and retrieve information regarding a state of the environment drawn from an informational source containing environmental information, which may reside in the robotic apparatus memory, otherwise accessible locally, or may be remote, as in a cloud computing system. The information may include or be indicative of a state related to weather conditions, for example.

At block 510, the method 500 includes performing an action based on the received information. The action may vary based on a type of received information, or the query that is presented by the robot. As an example, the robot may query the cloud to identify the clothing and details of the clothing and weather information to enable the robot to interact with the user. The action could also include storing the received information for future recognitions. For example, after receiving the information from the cloud, the robot could be able to recognize the clothing in the future enabling the robot to learn and adapt. Storing is an optional step.

As one example, environmental information is used by the robotic apparatus in performing an output function for the robotic apparatus based upon the environmental information obtained. User data can also be applied in the processing step to obtain information regarding a state of the user, and the output function can further include relating the state of the user and the state of the environment, e.g., weather conditions.

In one example, the robot may determine from sensory input and/or information received from the query that a user is sweating having just come in from the outdoors. The robot may further access electronic data indicating that the temperature was hot outside, and from a user device learn that the user was scheduled to run in the last hour. Processing these various data, the robot may determine a function of obtaining a drink of water for the user.

As a further example, the robot may assess that a human subject wearing clothing has a generally light-weight shirt and pants selected. Using environmental data gathered from other devices, such as an electronic weather service, or determined by the robot from its own sensors, the robot may make a determination that the weather outside is likely too cold for the human's currently selected clothing, and may thereby make a suggestion of some alternative, or additional, clothing more appropriate for the outside conditions.

In examples, block 510 may be executed by the robotic device accessing a database of output functions and selecting a given output function based on the environmental information and user-related data received and determined. The environmental data may be determined using sensors of the robot or received via a query request to a server. The user-related data may also be determined using sensors of the robot (e.g., capture images of a user) or received via a query request to a user-device to obtain information about communications between the user and the user-device. Other examples are possible as well.

Figure 6:
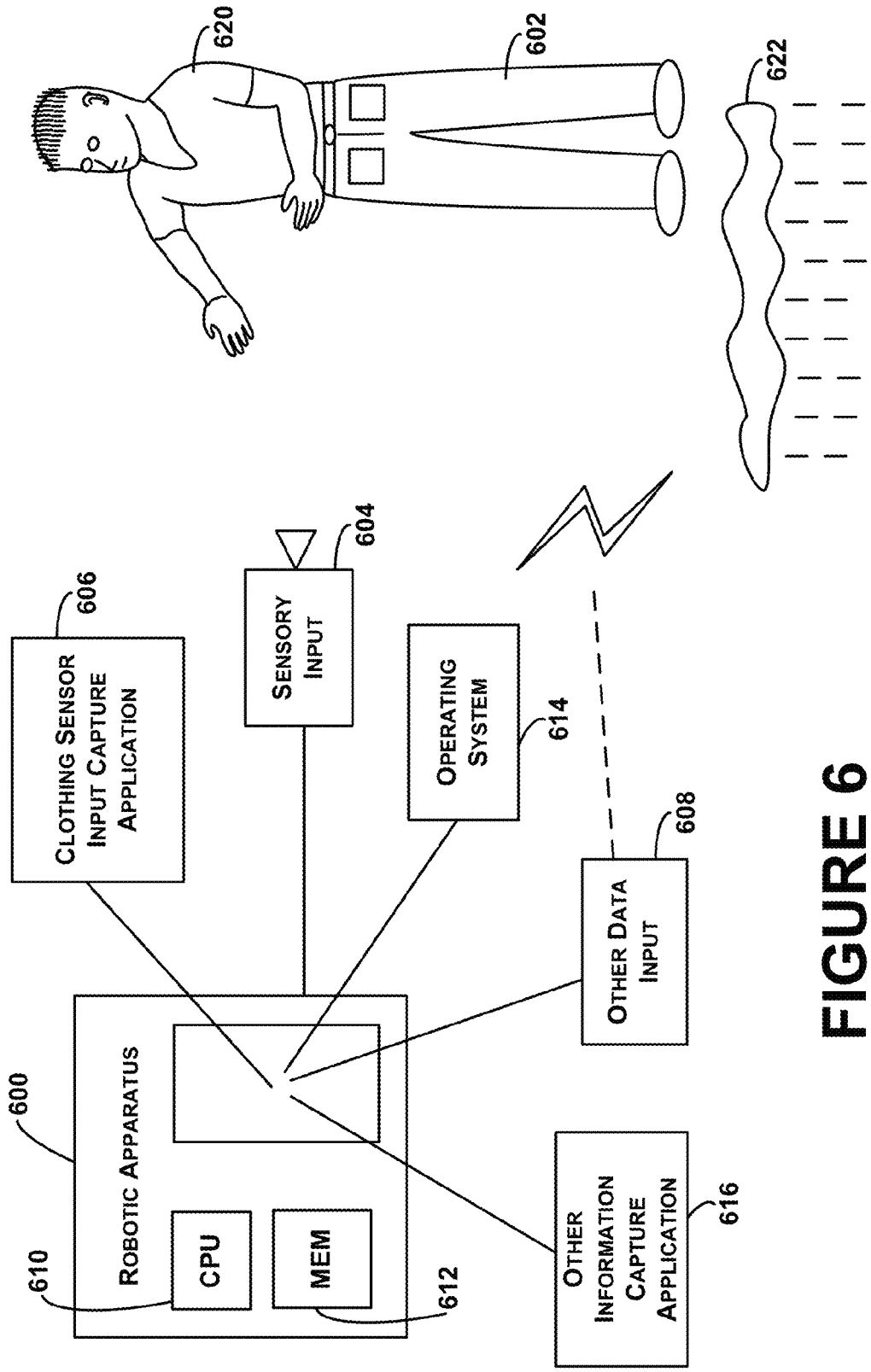
FIG. 6 is an example illustration of a robot obtaining various sensory inputs for clothing recognition.

FIG. 6 is an exemplary illustration of a robot 600 (robotic apparatus) interacting with a user wearing clothing, such as a pair of pants 602 and shirt 620, to perform object recognition and interaction, or other functions as described in FIG. 5. The robot 600 may include components of a computing system, including a CPU 610, memory 612 and an operating system 614.

Clothing may refer to whatever may be assessed in the way of garments, apparel, protective coverings, adornment or the like, which may be worn by a person or object, or displayed for ultimately being worn.

The robot 600 may engage in image and information capture in an interaction with the clothing using any sensory inputs 604 described above, such as a camera. The robot 600 may then initially process that sensory input using an appropriate clothing sensory input capture application 606. Alternatively, the raw sensory input may be uploaded through a query to a cloud computing system or some computational database, where the sensory input can be processed. In this example, the robot 600 also has the capability to obtain other data input 608, which could, for instance be environmental data (weather outside) 622 (here, it is raining), or data about the wearer, or likely wearer, of the clothing being sensed. That other information could be obtained using another information capture application 616, for instance. This could be captured electronically, such as by connecting with an Internet weather source for weather information. In some examples, the methodology of application 606 to facilitate object recognition may be a higher-level service (e.g., higher in a software stack), such that details and specifics for how to recognize an object may be performed by the cloud.

The robot 600 may be configured to perform actions/functions based on a result of object recognition, rather than or in addition to, performing functions regarding recognizing an object. As an example, using the application 606, the robot may execute software to perform immediate function calls, such as OrientObject( ), which may return information associated with an object (e.g., placing it right-side up), or RotateObject( ), which may cause the robot to pick up the object and obtain further views/sensory inputs. These immediate functions could be done through local processing within the robot 600, or by enabling function calls and operation through the cloud, which greatly facilitates control and operation of the robot without having to control or tie-up more limited computational capacities of the robot, for example.

There are many ways that the image capture of sensory input 604 may be obtained, one being the use of pixilation data taken of the clothing. This may be of an initial target area of the clothing item, and used to orient the robot assessment hardware (e.g., image capture camera, CCD, and the like). Multiple area images being used to estimate the possible location of clothing on a subject.

If the subject has a face, for instance, then determination of an input recognizing the existence of a face can then be used to orient the rest of the data being obtained. That is, the subject may be initially scanned to determine if a face is present. From the face position as an anchor, torso and limbs extended from the torso can thereby be resolved for the subject. Having determined a basic nature of the subject, then this can form a boundary of the clothing.

Figure 7:
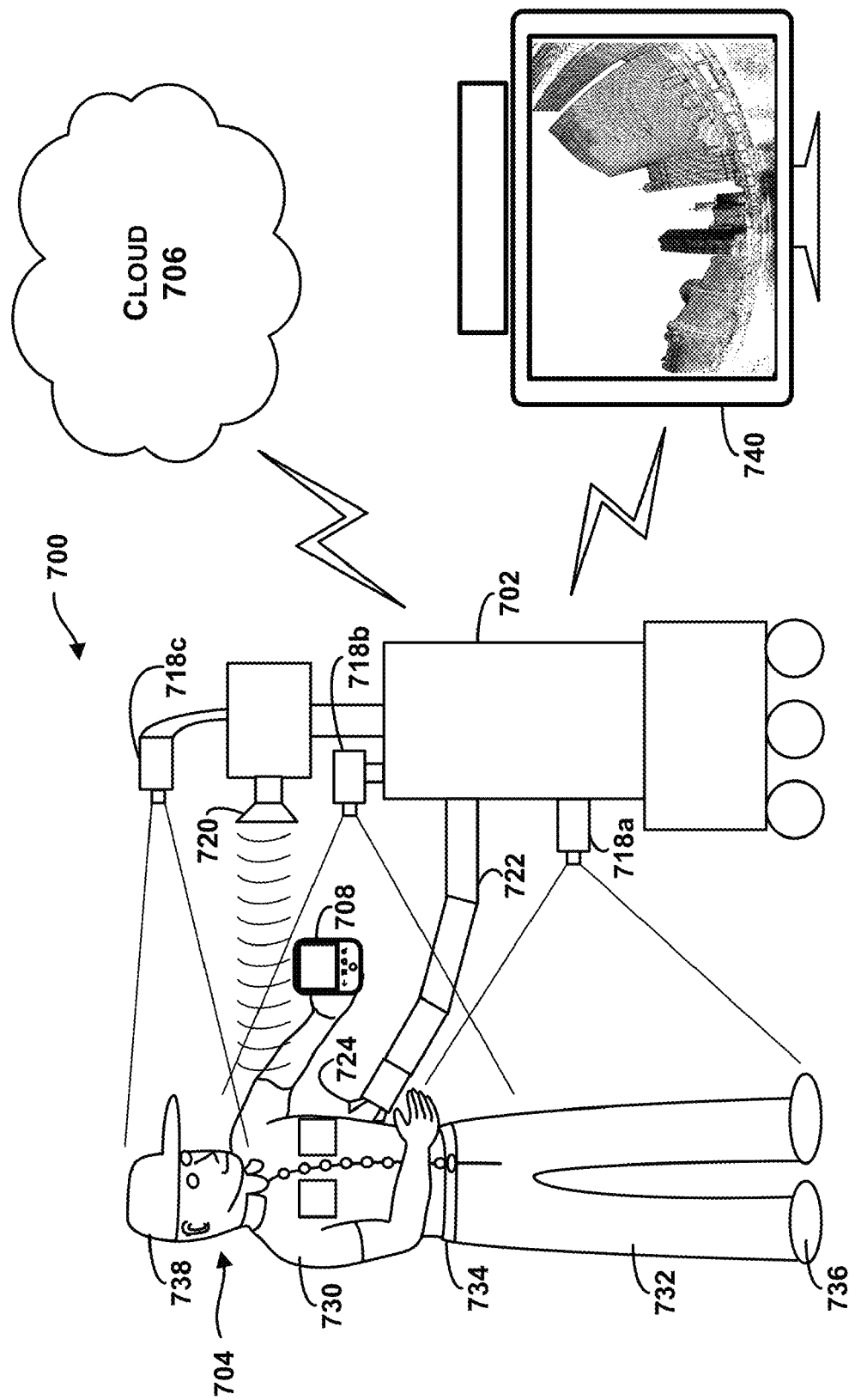
FIG. 7 illustrates an example system in which a robot may access a user device either directly (using wired or wireless connections) or through a cloud.

FIG. 7 illustrates an example system 700 in which a robot 702 may obtain sensory inputs of clothing being worn by an individual or user 704. In this example, the robot 702 could be coupled to a cloud 706 (using wired or wireless connections), and the robot 702 may further access a user device 708 (smart phone, portable PC, PDA, or the like) to obtain other data about the user 704.

The robot 702 may access the user device 708 to determine or identify information about a user, and the robot 702 may be configured to tailor a method of interaction with the user 704 based on the identified information and the information that will be retrieved concerning the clothing. There are many examples of types of information that the robot 702 may access including, but not limited to, a user's calendar to determine information associated with activities the user performed (or was scheduled to perform, e.g., who the user will meet with that day), a user's email, text messages, or other electronic correspondence. Other examples of types of information include accessing weather information.

The robot 702 is shown equipped with several optical image capturing cameras 718a-c. One camera might suffice, but in this example there are multiple cameras to enable a full body scan, as well as yielding some stereoscopic depth. The robot 702 is also provided with an ultrasonic, or other acoustic, scanner 720 to provide an ability to obtain some information about the material of the clothing, such as density, coarseness, contour, surface features, just to name a few.

The robot 702 is also provided with one or more extendable appendage or extensor 722. The appendage 722 includes tactile sensors at the end of finger-tip like members 724, which enable the robot 702 to obtain information on the article of clothing associated with typical "feel." Thee members 724 may also include chemical "sniffers" or receptors, which may obtain data about the chemical makeup of the sensed area. The appendage 722 also gives the robot 702 the ability to manipulate the clothing (here shown as a shirt 730, pants 732, belt 734, shoes 736 and hat 738).

Analysis may proceed by segmentation or gridding of the subject. This may be used for later assessment of a hat, shirt, coat, or a pair of pants, for instance. Besides acoustical sensing, reflectivity of a region may be used as an input for later assessment as to whether the particular article of clothing is baggy or tight, creased or wrinkled.

With some or all of the sensory input, processing of the clothing data then occurs. This can include a matching process using a database, library or general access information available locally to the robot 702, or accessed through a cloud-based computation system. Matching software may be used to extract similar images, and collateral information related to those images (e.g., manufacturer, cost, availability, material(s), demographics of common purchasers, and so forth). The similar image or images may be drawn from a library or collection of images (e.g., an e-commerce library).

The robot 702 also obtains information about the ambient environment, such as weather conditions. This can be done though an electronic data capture mechanism, such as accessing an electronic device or resource 740 having weather information or the like.

Figure 8:
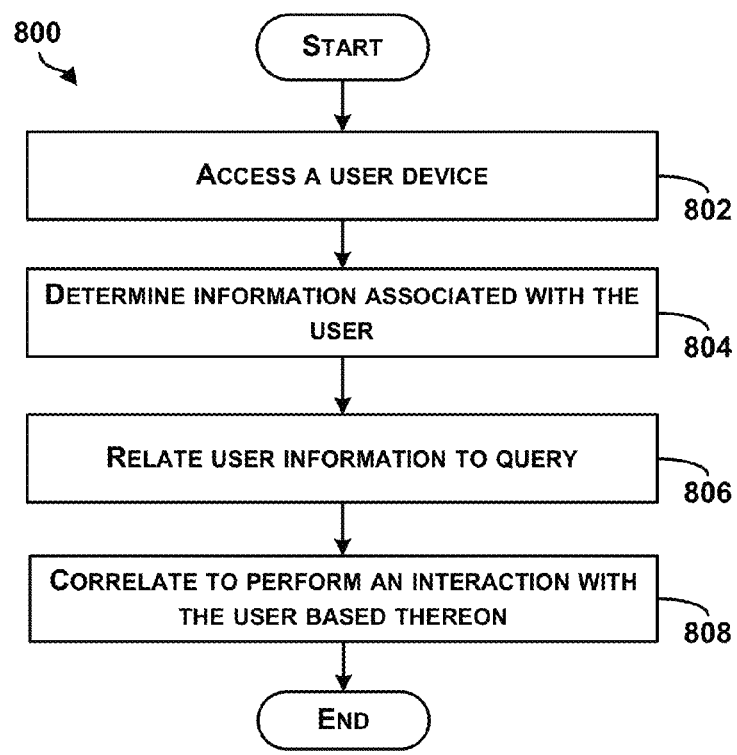
FIG. 8 is a block diagram of an example method of a robot accessing a user device to facilitate interactions with the user.

FIG. 8 illustrates an example method 800 for accessing information about a user from a user device 708. At block 802, the method 800 includes access a user device. For example, a robot may access a user device (e.g., mobile phone, PC, electronic picture frame) either directly or indirectly through a cloud.

At block 804, the method 800 includes determining information associated with the user. For example, the robot may access information on a user's mobile phone, such as a calendar application, email, call logs, photographs. The robot may further access contact data, user accounts, third party applications, on the mobile phone to determine information associated with the user.

At block 806, the method 800 includes the robot relating the user information obtained with information obtained on the clothing in point. The robot may make a conclusion or inference or selection in real-time using artificial intelligence based on an analysis of the data.

At block 808, the method 800 includes applying the related informational inputs from environmental assessment and user data determined or retrieved, and perform an interaction with the user based thereon. That may be a suggestion on what clothing may be alternatively available ("take an umbrella"), or what may be useful based upon some environmental or scheduling assessment.

The actions or functions of the method 800 may be performed by the robot, the cloud (or components of the cloud) in a distributed manner. Alternatively, all actions or functions of the method 800 may be performed locally by the robot.

Still as another alternative example, actions or functions of the method 800 may be performed by the robot, which may make queries to the cloud to facilitate performing the functions. For instance, the robot may access the schedule of the user, as by the robot querying the cloud to request an analysis of an email, and based on the analysis, the robot may make the inference regarding the dress of the user.

A robot may also obtain information from a user device communicating through a cloud. For example, referring to FIG. 1, a robot may utilize information in the user-profile to interact with a cloud such as cloud 102 shown in system 100. Alternatively, a robot may access cloud 102 to access the user-profile stored on cloud 102. A user-profile may include information identifying the mobile device 114 and the computer 112 each coupled to the cloud 102. The user-profile may also have information indicating when the user interacts with mobile device 114 and computer 112. A robot may use the user-profile to determine when to interact with the cloud 102 and/or with other robots (such as robot client 118) directly to obtain communication between the user and mobile device 114 and computer 112.

Actions or functions of the example methods may be performed by the robot, the cloud (or components of the cloud) in a distributed manner. Alternatively, all actions or functions of a method may be performed locally by the robot.

In another example, as described above with reference to FIG. 4, robots may interact and share information through the cloud. A given robot may determine and store preferences about a given user as to clothing. A robot may respond to different users in different ways. The robot may be configured to perform actions associated with a given person that may be learned over time based on interactions with a user that may be designed by a person/author, or may be a combination of learned and designed responses, for example.

A robot's knowledge can be transferred from one robot to another robot, or information stored on one robot can be shared with another robot over the cloud. This may enable one robot encountering a user to learn from experiences accumulated from other robots interacting with similar users, as well as many other forms of generalization and personalization.

In some examples, robots operating in a given city or country may be configured to operate according to local customs or cultures, and adapt suggestions to the local culture. The robots may receive shared personalities of another robot, but may modify the shared personality to be in line with local customs or cultures, for example.

5. CONCLUSION

It should be understood that arrangements described herein are for purposes of example only. As such, those skilled in the art will appreciate that other arrangements and other elements (e.g., machines, interfaces, functions, orders, and groupings of functions) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving, at a robotic device that includes at least one sensory device and at least one processor, an environmental input including data relating to an environmental condition about an environment in a vicinity of the robotic device;
receiving, at the robotic device, a user-related input including data relating to a user in a vicinity of the robotic device;
processing the environmental input to obtain information about a state related to a weather condition from an informational source containing environmental information;
processing, by the processor of the robotic device, the user-related input to obtain information about a state of a user;
determining an output function based on a relation between the state of the user and the weather condition; and
performing, by the robotic device, the output function.

2. The method of claim 1, wherein the at least one sensory device is configured to capture image data of the user.

3. The method of claim 1, wherein processing the environmental input to obtain information about the state of the environmental condition comprises:
   accessing a cloud computing system;
   obtaining environmental information related to the environmental input; and
   receiving the environmental information at the robotic device.

4. The method of claim 3, further comprising obtaining collateral information related to the environmental input in addition to the environmental information.

5. The method of claim 1, further comprising:
   obtaining, by a first device associated with the robotic device, the user-related input from a second device, wherein the user-related input includes data about communication between the user and the second device; and
   processing the user-related input with the environmental input to determine the output function to perform.

6. The method of claim 5, wherein the second device includes one or more of a personal computer, a mobile telephone, a tablet computer, and a landline telephone.

7. The method of claim 1, further comprising:
   based on the environmental input, determining a time of day; and
   wherein performing the output function comprises determining a given output function, from among a database of output functions, based on the time of day.

8. The method of claim 1, wherein the robotic device is configured to communicate with the user, and wherein the environment input includes data relating to an environmental condition about an environment in a vicinity of the user.

9. The method of claim 8, further comprising:
   determining clothing of the user; and
   wherein the output function comprises providing a suggestion of clothing for the user to wear based on the state of the environmental condition and the user-related input.

10. The method of claim 9, wherein determining the clothing of the user comprises determining the clothing based on one or more of an image of the user and communication with an object of the clothing.

11. The method of claim 1, wherein performing the output function comprises the robotic device operating in a mode configured to adapt to the environmental condition.

12. A non-transitory computer readable medium having stored therein instructions executable by a robotic device that includes at least one sensory device to cause the robotic device to perform functions comprising:
   receiving, at the robotic device, an environmental input including data relating to an environmental condition about an environment in a vicinity of the robotic device;
   receiving, at the robotic device, a user-related input including data relating to a user in a vicinity of the robotic device;
   processing the environmental input to obtain information about a state related to a weather condition from an informational source containing environmental information;
   processing the user-related input to obtain information about a state of the user;
   determining an output function based on a relation between the state of the user and the weather condition; and
   performing, by the robotic device, the output function.

13. The computer readable medium of claim 12, wherein functions further comprise performing an output function based on the weather condition.

14. A robotic device comprising:
   one or more processors;
   at least one sensor coupled to the one or more processors and configured to capture environmental data about an environment in a vicinity of the sensor or a user; and
   memory including instructions stored thereon executable by the one or more processors to perform functions comprising:
      obtaining user-related data from an electronic device, wherein the user-related data relates to communication between the user and the electronic device;
      obtaining, from the at least one sensor, environment sensory data about a sensed environment condition;
      processing the environment sensory data to determine environment information about a state related to a weather condition from an informational source containing environment information;
      processing the user-related data to obtain information about a state of the user; and
      determining an output function based on a relation between the state of the user and the weather condition.

15. The robotic device of claim 14, wherein the at least one sensor comprises one or more of an image capture device, an acoustic sensor device, and an electronic data acquisition device.

16. The robotic device of claim 14, further comprising a communication interface configured to communicate with the informational source.

17. The robotic device of claim 14, wherein the environment sensory data includes information about a sensed ambient environment of the robotic device.

* * * * *